United States Patent [19]
Bowen

[11] 3,802,164
[45] Apr. 9, 1974

[54] DEVICE FOR SEPARATING SOLID OR LIQUID PARTICLES FROM A GASEOUS MEDIUM

[75] Inventor: Mack D. Bowen, Smyrna, Ga.

[73] Assignee: Georgia Tech Research Institute, Atlanta, Ga.

[22] Filed: Apr. 21, 1971

[21] Appl. No.: 136,099

[52] U.S. Cl. .................. 55/338, 55/419, 55/459, 110/8 A, 209/144
[51] Int. Cl. ............................................. B01d 45/12
[58] Field of Search ............ 55/457, 419, 459, 399, 55/338; 209/211, 144; 110/8 A

[56] References Cited
UNITED STATES PATENTS

| 1,906,432 | 5/1933 | Summers | 55/457 |
| 2,981,369 | 4/1961 | Yellott et al. | 55/399 |
| 3,358,844 | 12/1967 | Klein et al. | 209/211 |
| 3,577,711 | 5/1971 | Bernardo | 55/459 |
| 3,590,558 | 7/1971 | Fernandes | 55/457 |

Primary Examiner—Bernard Nozick
Attorney, Agent, or Firm—Newton, Hopkins & Ormsby

[57] ABSTRACT

A device for use in separating solid particles or liquid droplets from a gaseous medium, including an elongated cylindrical container having a contoured flow control plug located adjacent a bottom end with material introducing means located adjacent a top end. A stream of gaseous medium with entrained particulate material is introduced adjacent the top end and is caused to flow helically downward adjacent the inner wall of the container toward the contoured flow control plug. The plug is in the form of an inverted frustoconical section surmounted by an upright, concave radiused cone which presents, below the concave cone, a high pressure region in which the particulate material is entrapped and retained and forming, above the tip of the concave cone, a stable and high speed vortex extending to an exhaust tube which projects downwardly into the chamber beyond the gaseous medium inlet. The plug also causes the gaseous medium to traverse the chamber several times before it leaves the vortex.

8 Claims, 7 Drawing Figures

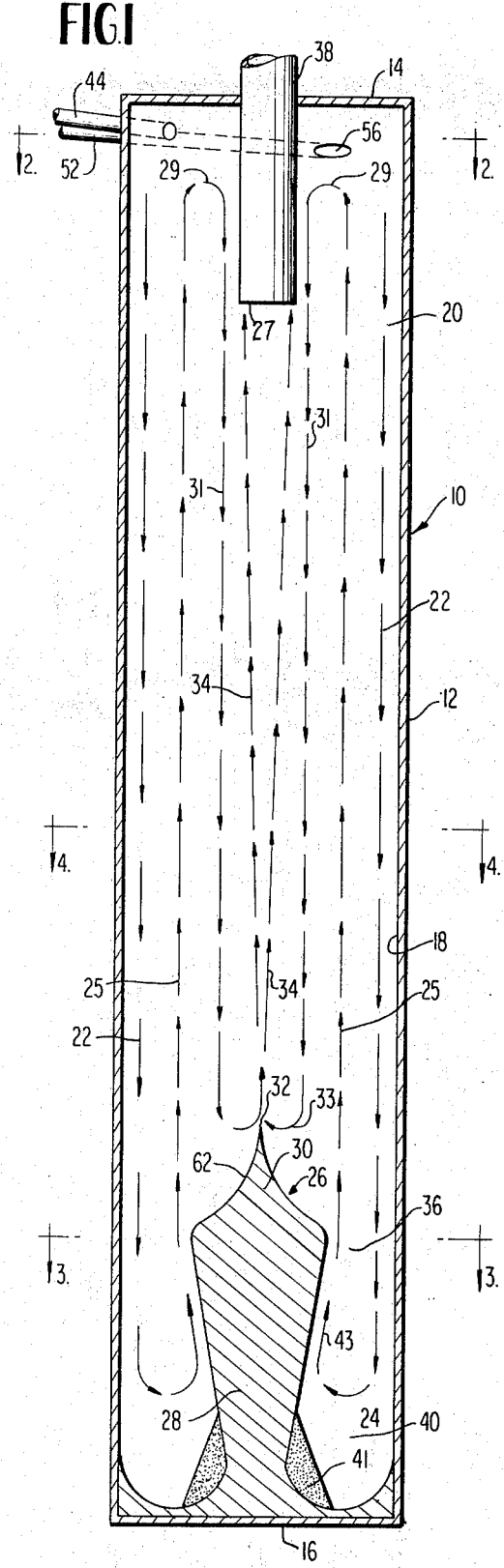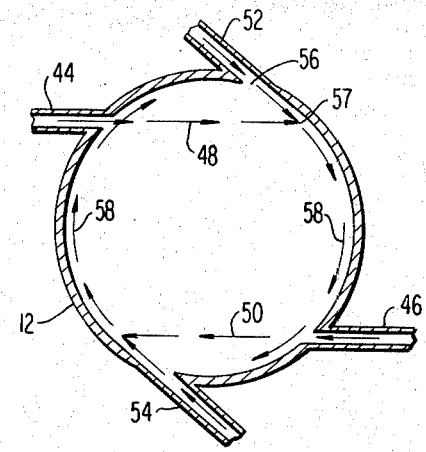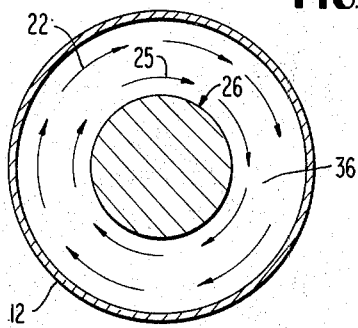

INVENTOR.
MACK D. BOWEN
BY Newton, Hopkins, & Ormsby
ATTORNEYS

DEVICE FOR SEPARATING SOLID OR LIQUID PARTICLES FROM A GASEOUS MEDIUM

BACKGROUND OF THE INVENTION

There is presently a great need for a compact, efficient and economical device for separating particles such as solids or liquid droplets from gaseous mediums. A number of complex and expensive procedures are employed for effecting this result to separate and remove particles down to very small sizes. Cyclone-type separators which have been utilized to separate solids or liquids from gaseous mediums are known to be restricted in the size of the particles so separated. Many of the prior art separators develop a pulsating effect within the separating chamber when the flow velocity changes thereby reducing the efficiency of a separating operation. Various types of wet scrubbing devices have also been used for removing contaminants from gaseous mediums but they are bulky and expensive.

There is also a great demand for an incinerator which is effective in disposing of our increasing quantities of waste material. One type of waste material which presents a disposal problem is the by-products of the peanut industry, such as peanut hulls.

Peanut hulls are produced in our southeastern states in extremely large quantities, and for peanut processors, they represent an agricultural waste product which is difficult and expensive of disposal. The most common form of disposal is incineration, but the emissions from the incinerators are extremely high, and it is moreover expensive due to the frequent need for replacement of the refractory insulation of the incinerators. Contemporarily, the disposal problem associated with peanut hulls is difficult, but in the near future will become acute with the enforcement of federal regulations governing air pollution.

Other means of disposal such as burial and use as a livestock feed filler have been tried but have been proven unsatisfactory primarily for the reason that tremendous quantities are involved, the hulls are of low bulk density and, moreover, contain a residual pesticide content. Burial results in a return of the pesticide to the soil which is undesirable, and the bulk density makes transportation costs high. Other uses such as chicken feed additives and as a mulch have also been considered, but again, the pesticide content and the quantities involved make these uses impractical.

BRIEF SUMMARY OF THE INVENTION

The present invention is in some respects similar to a cyclone separator in that a stable vortex is formed; but unlike a cyclone separator, the present invention entraps and retains the separated particles in a high pressure region of the device and is capable of removing particles down to much smaller sizes than can be obtained in connection with cyclone separation.

Essentially, the present invention involves a cylindrical chamber having a flow control plug at one end which defines an annular pocket for entrapping and retaining the solid particles, the gaseous medium being introduced and removed from the opposite end of the chamber. The flow control plug also causes the gaseous medium to traverse the length of the chamber several times before establishing discharge through the stable vortex, thus materially increasing the residence time of the material within the chamber.

One form of the separating device is provided with means for incinerating particulate material trapped therein. The material trapped in the separating device and the ash by-products of an incinerating operation can be removed from the container by a rotary valve means located in the container below the flow control plug.

BRIEF DESCRIPTION OF THE FIGURES OF DRAWING

FIG. 1 is a longitudinal section taken through a device constructed according to the present invention and illustrating the axial flow directions of the helical flow layers obtained within the device;

FIG. 2 is a transverse section taken substantially along the plane of section line 2—2 in FIG. 1 and illustrating the inlet means which is particularly adapted to reduce erosion due to impingement of solid particles against the inner wall of the container.

FIG. 3 is a transverse section taken substantially along the plane of section line 3—3 of FIG. 1 and illustrating the constructed entrance mouth for the particle residence chamber;

FIG. 4 is a transverse section taken substantially along the plane of section line 4—4 in FIG. 1 and illustrating the flow patterns of the various helical flow layers;

DESCRIPTION OF THE ILLUSTRATIVE EMBODIMENTS

Figure 5:
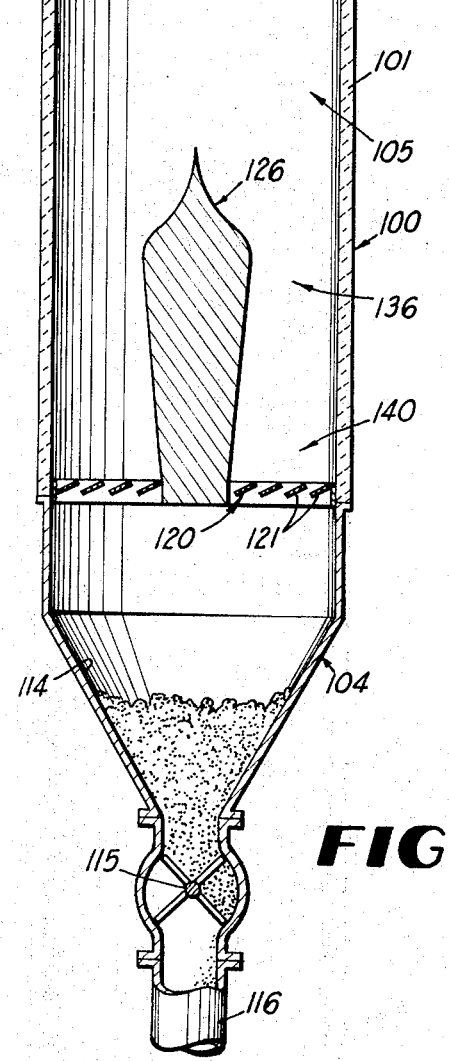
FIG. 5 is a longitudinal section taken through a modification of the device constructed as an incinerator and showing means for removing the ash by-products of combustion.
Figure 6:
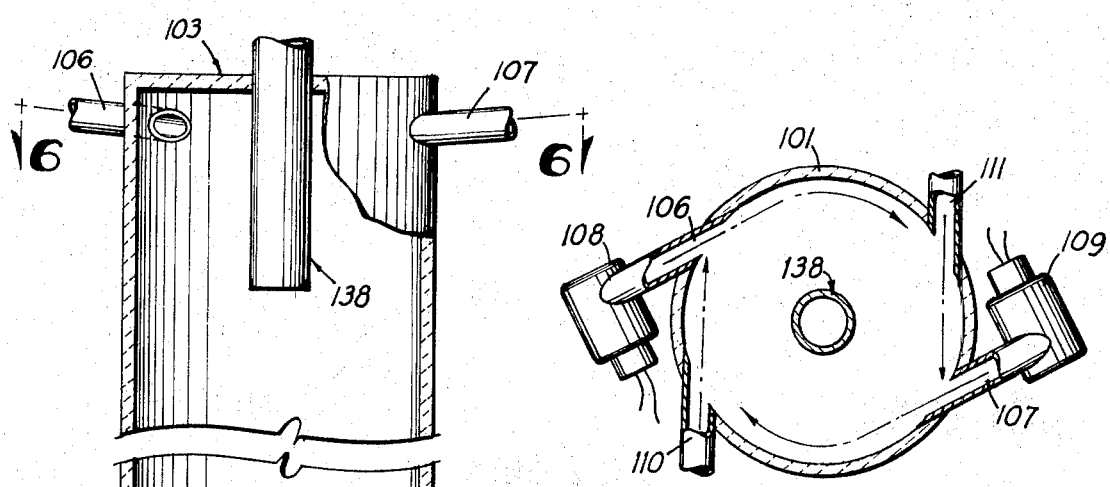
FIG. 6 is a transverse section taken substantially along the plane of section line 6—6 in FIG. 5 and illustrating the manner of end-feeding the combustion supporting gas and particulate waste material.
Figure 7:
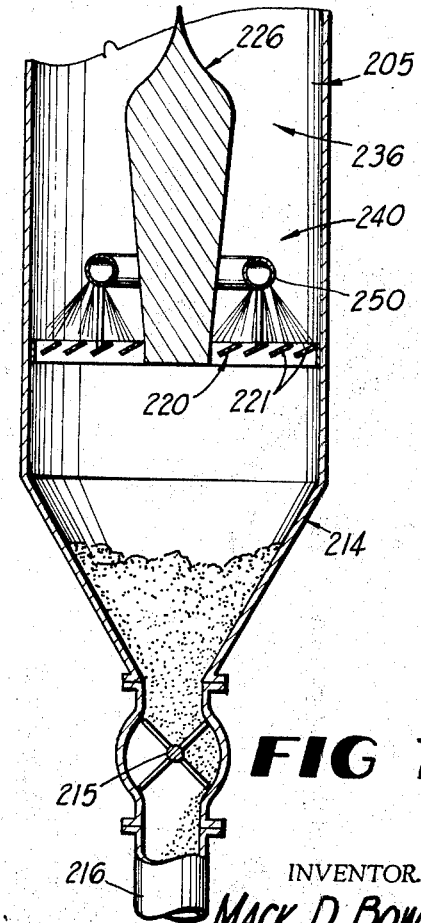
FIG. 7 is a fragmentary longitudinal section taken through a modified embodiment showing means for removing particulate material, by scrubbing with a liquid spray in the base region.

Referring now to the drawings, the illustrative embodiments embodying the principles of the present invention will be described with reference to a material separating device, as shown in FIGS. 1-4; a material incinerator, as shown in FIGS. 5 and 6; and modified material separating device having means for removing particulate material, as shown in FIG. 7.

MATERIAL SEPARATING DEVICE

With reference to FIG. 1, a housing is indicated generally by the reference character 10 which will be seen to include a cylindrical wall portion 12 having opposite end closures 14 and 16. The inner wall surface 18 of the housing or body 10 forms a cylindrical chamber 20 into which, at the upper end thereof in FIG. 1, particulate material such as solids or liquid droplets and a stream of gas entraining such particles are introduced to flow helically downward within the chamber 20 toward the lower end thereof. The inlet means may be a single inlet duct or a plurality of inlet ducts as will be hereinafter described; but, in any event, the inlet means causes gaseous medium with particulate material entrained therein to swirl helically downward in a layer closely adjacent the inner surface 18 and which has a net axial direction as indicated by the arrows 22 in FIG.

1. A contoured flow control plug 26 is provided in the lower end of the chamber and defines, with the inner wall of the chamber, a residence chamber 40 having a constricted annular inlet mouth 36. The outer helical flow layer 22 reverses direction as indicated by the reference character 24 within the confines of the residence chamber 40 and creates an upwardly flowing, swirling helical flow layer 25 within the confines of the outer layer 22. As will hereinafter be described in more detail, the contour of the flow control plug 26 is such as to cause the second flow layer 25 to be positioned toward the outer layer 22 in the region of the annular inlet mouth 36 and also causes the second layer 25 to extend substantially to the region slightly above the discharge mouth 27 of the gaseous medium withdrawal means 38, whereat the flow again reverses axial direction as indicated by the reference character 29 and forms a third helical, swirling flow layer 31 within the confines of the second layer 25. The tip portion 30 of the flow control plug is contoured to cause the third flow layer to reverse direction as indicated by the arrow 33 and create the stable vortex extending from the tip 32 of the tip portion 30 of the flow control plug, which vortex extends upwardly to the discharge mouth 27 as indicated by the arrows 34.

FIG. 4 illustrates the helical flow patterns of the various helical flow layers 22, 25, 31 and of the vortex core 34. The first flow layer 22 entering the residence chamber 40 creates a high pressure within this region; and the material, indicated by the reference character 41, is separated in this region of highest pressure and collects around the base of the flow control member 28. This base is formed of inverted, frusto-conical section so as to cause a positioning of the flow as indicated by the reference character 43 of the second layer toward the outer layer 22 which tends to retain the high pressure condition within the chamber 40 and also to assure that particles down to very small sizes are separated into and retained by the residence chamber 40. This positioning effect also causes the establishment of the second helical flow layer 25 and prevents the gaseous medium from channelling directly to the vortex core 34, thereby assuring a long residence time of the gas within the separating chamber.

The above described flow control plug 26 is operable to maintain a stable vortex at wide ranges of mass flow and the separating efficiency increases continuously as the total flow increases. The sharper the point on plug 26, the sturdier the vortex remains. The vortex core attaches itself to needle tip portion of the plug and if the plug tip is shifted laterally, the vortex core will follow.

In FIG. 2 a preferred embodiment of inlet means is shown and will be seen to consist of a tangentially directed tube 52 having a discharge port 56 directing flow tangentially and in slightly axially inclined relationship into the chamber 20; and, additionally, an inlet tube 44 is directed to cause flow chordwise of the chamber, as indicated by the reference character 48, so that the flow emanating from the tube 52 and the chordwise flow emanating from the tube 44 intersect at 57 and join to provide the tangential inlet flow 58 as indicated. If desired, further inlet tubes 46 and 54 may be provided, the former having a chordwise flow inlet as indicated by the reference character 50. A preferred axial inclination of the inlet means is in the order of 6°.

The arrangement of FIG. 2 is intended to minimize erosion of the inner wall 18 of the cylinder 10; and, for this purpose, the tangentially directed tubes 52 and 54 are intended to contain a flow of gaseous material having little, if any, solids or liquids entrained therein, whereas the flow through the tubes 44 and 46 are heavily laden with the particulate material desired to be removed. This configuration primarily lends itself to adaptation for incinerator use wherein a gas inlet would be effected at the tubes 52 and 54 and particulate material to be incinerated would be inducted through the tubes 44 and 46. In this manner, the interior of the chamber 20 would be supporting combustion and decomposing the particulate material; while, at the same time, retaining the residue within the residence chamber 40 so that the exhaust emanating from the outlet means 38 would be substantially free from entrained particles.

FIG. 3 is intended to show the annular arrangement of the constricted entrance mouth 36 for the residence chamber 30. It will be seen that the bulbous contoured plug 26 forms the constriction 36, and for this purpose it is preferred that the width of the entrance mouth 36 be in the order of 0.34 times the diameter of the cylinder 12.

It has been found that to best control the flow characteristics of the device as indicated in FIG. 1, the height of the base portion of the plug 28 should be in the order of 0.58 times the diameter of the cylinder 12, the diameter of the discharge mouth 27 should be in the order of 0.2 times the inner diameter of the cylinder 12 and the surface 62 of the tip portion 30 of the flow control plug 26 should be radiused on an arc about 0.375 times the diameter of the inner surface of the cylinder 12. Additionally, as mentioned hereinbefore, the length of the vortex core 34 should be in the order of forty times its diameter.

MATERIAL INCINERATOR

As shown in FIGS. 6 and 7, a modified form of the present invention is constructed in the form of an incinerator capable of disposing of waste material, such as peanut hulls. The incinerator is indicated generally by the reference character 100 which will be seen to include a cylindrical wall portion 101 having opposite end closure means 103, 104. The cylindrical wall 101 and end closure 103 are constructed of conventional refractory material for defining a combustion chamber 105 into which, at the upper end thereof in FIG. 5, particulate waste product material, such as peanut hulls, and a stream or streams of combustion supporting gas are introduced to flow helically downward within chamber 105 toward the lower end thereof. The flow pattern of the particulate material and gaseous medium will be the same as described hereinabove and as illustrated by arrows in FIGS. 1–4.

The combustion supporting gas, such as air, is introduced into chamber 105 through conduits 106, 107. Conventional blower and heat producing means 108, 109 are operatively associated with conduits 106, 107, respectively. The heat producing means produce a sufficient elevation of temperature to cause the waste products to be ignited and burned in the incinerator chamber 100. As shown in FIG. 6, entrained waste products in air are introduced by conduits 110, 111 which as shown, are directed chordwise with respect to cylindrical wall 101, in slightly downward inclined relationship. The combustion supporting gas introduced by the conduits 106 and 107 is substantially tangentially of the cylindrical wall 101, the openings 106a, 107a of these conduits being located substantially at the points at which flows of material from the conduits 110 and 111 would otherwise impinge the inner wall surface of the chamber wall 101, thereby minimizing erosion due to the inflow of material.

The net effect of this manner of introduction of the material and the air is such as to create a helical flow of waste product entrained in the air substantially as it is indicated hereinabove. This flow of material and air of course closely hugs the inner wall surface 101 of the chamber and continues this helical downward flow until the base of the chamber is reached wherein the flow of gas, still helical, reverses itself as previously described in conjunction with the arrows 24 in FIG. 1 of the drawings.

As shown in FIG. 5, end closure means 104 is formed as a hopper 114 having a rotary control valve means 115 communicating with a discharge conduit 116. Hopper 114 will provide a collection reservoir for containing a predetermined amount of ash by-products of combustion while valve 115 will provide a controlled means for discharging ash from hopper 114 through discharge conduit 116.

Located above hopper 114 is a grate structure 120 constructed of a plurality of spaced deflector vanes 121 detailed to permit the ash by-products of combustion to pass therethrough into hopper 114. Vanes 121 may be adjustable to vary the size of the openings between vanes and/or to vary the angle of the vanes.

As shown in FIG. 5, a contoured flow control plug 126 is supported above grate 120 and defines, with chamber wall 101, a residence chamber 140 having a constricted annular inlet mouth 136. Flow control plug 126, residence chamber 140 and annular inlet mouth 136 are substantially the same as the control plug 26, chamber 40 and mouth 36, respectively, described hereinabove and as shown in FIGS. 1–4, and reference is made to the above indicated description for the details of the material flow pattern within combustion chamber 105.

The air and gas by-products of combustion are exhausted from combustion chamber 105 by a flue means 138 located within end closure means 103. Flue means 138 is detailed in location, relative to flow control plug 126, in the same manner as the location of conduit 38 relative to plug 26 described above.

MODIFIED MATERIAL SEPARATING DEVICE

Referring now to FIG. 7, a modified material separating device is described which includes means for purging the separation chamber of separated material. The device of FIG. 7 includes a separation chamber 205 having a collection hopper and grate means. Collection hopper is indicated generally by reference character 214 and includes a controlled discharger valve means 215 operable for discharging material from hopper 214 outwardly through a discharge conduit 216. Grate means 220 having a plurality of spaced vane means 221 is supported above hopper 214 to allow separated material to pass from a residence chamber 240 to collection hopper 214.

As shown in FIG. 7, separation chamber 205 includes a flow control plug 226 supported above grate means 220. Plug 226 is supported relative to chamber wall to define the residence chamber 240 and an inlet mouth 236. Plug 226 is identical to plug 26 and will control the flow pattern within chamber 205 in the same manner as described above relative to FIGS. 1–4.

An annular perforated dispensing manifold 250 is concentrically supported around plug 226 above grate 220. Dispensing manifold 250 is connected by suitable means to conventional fluid supply means (not shown) for spraying a quantity of fluid into the particle separation region and down through grate 220, hopper 214, valve 215 and out through conduit 216 for purging the residence chamber 240 and hopper 214 of separated material contained therein.

It now becomes apparent that the illustrative embodiments described herein are capable of obtaining the above stated objects and advantages. It is obvious that those skilled in the art may make modifications in the details of construction without departing from the spirit of the invention which is to be limited only by the scope of the appended claims.

I claim:

1. A device for separating and removing entrained material from a gaseous medium, comprising:

a. an elongate cylinder having first end wall means at one end thereof and second end wall means at the opposite end thereof whereby to define a chamber;

b. inlet means connected to the side wall of said cylinder adjacent said first end wall means for forcibly introducing the gaseous medium and entrained material into said chamber to flow tangentially of the cylinder and axially toward said second end wall means, whereby to form an outer helical flow layer adjacent the inner surface of said cylinder which reacts with said second end wall means to reverse axial direction and form a second helical flow layer within the confines of said outer layer;

c. outlet conduit means extending through said first end wall means and presenting a discharge mouth disposed concentrically within said chamber and positioned beyond said inlet means toward said second end wall means; and d. flow directing means connected to said second end wall means and extending therefrom toward said mouth of the outlet conduit means and terminating in spaced relation thereto for causing said second helical flow layer to extend back beyond and outside the confines of said discharge mouth whereat it reverses axial direction to form a third helical flow layer within the confines of said second layer, said flow directing means comprising a tapered body including means defining an enlarged annular residence pocket for said entrained material adjacent said second end wall means and within which pocket axial flow reversal of said first layer takes place, said tapered body tapering outwardly and extending toward said first end wall means to define with the inner wall of the cylinder a constricted annular entrance mouth to said pocket and the circumference of said body at said entrance mouth being greater than the mouth of said discharge mouth of the conduit means to displace said second flow layer outwardly as it progresses to said first end wall means outside the region of said discharge mouth whereat it reverses axial direction to form said third helical flow layer, said tapered body including a tip portion means defining an end of the tapered body directed toward said conduit means and contoured to reverse the axial direction of said third flow layer and create a stable vortex extending therefrom to said discharge mouth.

2. The device according to claim 1 wherein said tip portion means is in the form of a concave cone.

3. The device according to claim 1 wherein said flow directing means includes an inverted frusto-conical base extending from said second end wall means to said tip portion means whereat said entrance mouth is defined.

4. The device according to claim 3 wherein said tip portion means is in the form of a concave cone.

5. The device according to claim 1 wherein said discharge mouth is spaced from the extremity of said tip portion means by a distance in the order of 5.2 times the inner diameter of said cylinder and the width of said entrance mouth is in the order of .34 times said inner diameter.

6. The device according to claim 5 wherein said tip portion means is in the form of a concave cone.

7. The device according to claim 5 wherein said flow directing means includes an inverted frusto-conical base extending from said second end wall means to said tip portion means whereat said entrance mouth is defined.

8. The device according to claim 7 wherein said tip portion means is in the form of a concave cone.

* * * * *